United States Patent
Cotte et al.

(10) Patent No.: US 11,436,460 B2
(45) Date of Patent: Sep. 6, 2022

(54) SYSTEM FOR CONVEYING OBJECTS USING PACKAGES PROVIDED WITH A DEVICE FOR DISPLAYING VISUAL CODES

(71) Applicant: PA. COTTE SA, Pully (CH)

(72) Inventors: Pierre-Alain Cotte, Amberg (DE); Thomas Nansot, Nantes (FR); Laurent Gaussin, Suce sur Erdre (FR)

(73) Assignee: PA. Cotte SA, Pully (CH)

( * ) Notice: Subject to any disclaimer, the term of this patent is extended or adjusted under 35 U.S.C. 154(b) by 0 days.

(21) Appl. No.: 17/295,719

(22) PCT Filed: Nov. 15, 2019

(86) PCT No.: PCT/EP2019/081560
§ 371 (c)(1),
(2) Date: May 20, 2021

(87) PCT Pub. No.: WO2020/104341
PCT Pub. Date: May 28, 2020

(65) Prior Publication Data
US 2022/0004833 A1      Jan. 6, 2022

(30) Foreign Application Priority Data

Nov. 23, 2018   (FR) ...................................... 1871799

(51) Int. Cl.
*G06K 7/10*       (2006.01)
*G06K 19/06*      (2006.01)
(Continued)

(52) U.S. Cl.
CPC .......... *G06K 19/06112* (2013.01); *G06F 3/14* (2013.01); *G06K 19/06028* (2013.01);
(Continued)

(58) Field of Classification Search
CPC ................................................ G06K 19/06112
(Continued)

(56) References Cited

U.S. PATENT DOCUMENTS 7,766,238 B2    8/2010  Gelbman
2017/0148077 A1*  5/2017  Phillips ................ G06Q 10/087
(Continued)

FOREIGN PATENT DOCUMENTS

WO        2018/055156       3/2018

OTHER PUBLICATIONS

English translation of the International Preliminary Report on Patentability issued by the International Searching Authority, dated May 25, 2021, for International Patent Application No. PCT/EP2019/081560; 8 pages.

(Continued)

*Primary Examiner* — Allyson N Trail
(74) *Attorney, Agent, or Firm* — Faegre Drinker Biddle & Reath LLP (57) ABSTRACT

A system for distributing objects, including:
packages forming containers for the shipping of objects, each package incorporating an electronic display device and a computer unit; and
a computer platform including:
a geolocation system. The database contains, for each package a series of visual codes, and the computer unit of each package is parameterized to select a visual code and control the electronic display device so that it displays the selected visual code.

36 Claims, 2 Drawing Sheets

(51) Int. Cl.
*H04W 4/029* (2018.01)
*G06F 3/14* (2006.01)
*G06K 19/077* (2006.01)
*G06Q 50/28* (2012.01)

(52) U.S. Cl.
CPC . *G06K 19/06037* (2013.01); *G06K 19/07705* (2013.01); *G06K 19/07707* (2013.01); *H04W 4/029* (2018.02); *G06Q 50/28* (2013.01)

(58) Field of Classification Search
USPC .......................................................... 235/494
See application file for complete search history.

(56) References Cited

U.S. PATENT DOCUMENTS

| | | | |
|---|---|---|---|
| 2018/0106742 A1* | 4/2018 | Wilkinson | G01D 11/00 |
| 2019/0347612 A1* | 11/2019 | Anders | G06Q 10/0833 |
| 2021/0165979 A1* | 6/2021 | Wilkinson | G06Q 10/0833 |

OTHER PUBLICATIONS

International Search Report and Written Opinion issued by the International Searching Authority, dated Dec. 5, 2019, for International Patent Application No. PCT/EP2019/081560; 12 pages.

* cited by examiner

SYSTEM FOR CONVEYING OBJECTS USING PACKAGES PROVIDED WITH A DEVICE FOR DISPLAYING VISUAL CODES

CROSS-REFERENCE TO RELATED APPLICATIONS

The present application is a national stage entry of International (PCT) Patent Application Number PCT/EP2019/081560, filed Nov. 15, 2019, which claims priority to French Patent Application No. 1871799, filed Nov. 23, 2018, the subject matter of each is expressly incorporated herein by reference.

The field of the invention is that of logistics. More precisely, the invention relates to the distributing of objects, and more precisely objects generally coming from electronic retail platforms or transferred from one private individual to another.

Of course, the invention also applies to objects of smaller dimensions, which can even include the dispatching of envelopes.

For the sake of simplicity, the term "package" is hereinafter used to refer to both boxes used to send objects and to envelopes.

Conventionally, the packages are transported by several different operatives and are identified by means of visual codes during their distributing. These visual codes in particular take the form of bar codes printed on stickers bonded to the packages.

As the package is distributed, these bar codes in particular enable the identification of the package by each of the operatives. In other words, each bar code is generally readable by a single one of the operatives.

Hence, the packages possess as many bar codes as there are operatives involved in their distributing.

It can then be difficult for operatives to find the bar codes they can read. The more operatives there are in the distribution chain, the more difficult it is.

Furthermore, the time taken to search for the bar codes has a direct repercussion on its delivery time.

Moreover, the stickers can be pulled off (even partially), or become debonded, for example when the adhesive is not strong enough.

Thus, an operative of the distribution chain may not be able to correctly read its bar code, or even find it, if it has disappeared.

This then leads to a delay in the distributing of the package, and therefore an obstruction for the recipient of the package.

In addition, the bonding of the bar codes takes up considerable time for staff preparing or sorting the packages. This time, at present optimized, is difficult to reduce.

The invention has the aim of palliating the drawbacks of the prior art.

More precisely, the invention has the aim of proposing a system for distributing objects allowing quick identification of the packages by the operatives involved in the distributing.

The invention also has the aim of providing one such system that is easy and quick to implement.

The invention moreover has the aim of providing one such system allowing the safe distributing of the objects.

These aims, and others that will appear below, are achieved owing to the invention which has as its subject a system for distributing objects, comprising:
packages incorporating:
first wireless communication means;
a computer unit;
an electronic display device;
a computer platform including:
at least one database;
second wireless communication means;
a geolocation system including third wireless communication means;
characterized in that the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code.

The object distributing system is then simplified. Specifically, the use of visual codes and their display on electronic display devices makes it possible to simplify the search for the operatives in the distribution chain.

The operatives only have to consult the electronic display device, which can where applicable be highlighted on the package, to read the visual code.

Preferably, there is only one electronic display device on the package.

Moreover, the automatic selection, by the computer unit, of the correct visual code of the logistical sequence, makes it possible not to display all the visual codes at the same time. The ease of reading of the visual codes is yet further improved for the operatives of the distribution chain. Finally, the use of digital means (display device, database, computer unit etc.) makes it possible to limit the risk of lack of readability of the visual code. Specifically, there is no, or almost no, risk of debonding or damage to the visual code, unlike the stickers of the prior art.

Advantageously, the digital step signal is emitted by means belonging to the following group:
computer platform;
geolocation system;
electronic actuator carried by the package;
roaming electronic device;
fixed terminal for detecting the proximity of a package.

Such means allow the emission of a digital signal by wireless communication means for example. Also, it is easy for these means to allow the modification of the visual code on the display device.

Preferably, the visual codes belong to the following group:
bar codes of one-dimensional or two-dimensional type;
light code;
alphanumeric code.

These signals are simple to implement and can be easily read by optical means or by the operatives of the distribution chain, particularly in the case of alphanumeric codes.

According to an advantageous embodiment, the electronic display device comprises at least one component out of:
a digital label;
a set of light-emitting diodes.

These components are simple to use and allow the display of easily identifiable visual codes. Moreover, such components are inexpensive and only require low power to operate.

Preferably, the digital label is of electronic paper type.

Electronic paper offers the advantage of consuming very little power and ensuring a precise display. Furthermore, the code displayed by such an electronic paper is fixed as long as another electronic signal does not generate a modification of the display on the electronic paper.

It should moreover be noted that any type or nearly of visual code can be distributed by the electronic paper.

Preferably, each light-emitting diode is of RGB type.

This allows for one and the same diode to be able to emit several different colors of light. Hence, a large number of visual codes, as a function of their colors and their order in particular, can be displayed by the light-emitting diodes.

Advantageously, the digital label comprises at least two display areas each allowing the display of a visual code, for example a postal address and a bar code.

It is then possible to display a first bar code usable by an operative holding the package at the same time as a second bar code usable by an operative to whom the package will be entrusted. Thus, while limiting the number of displayed bar codes, the transmission of the package from one operative to another is facilitated and accelerated with respect to the prior art in which each of the operatives must search for his bar code before using it.

According to an advantageous embodiment, the system for distributing objects also comprises a plurality of roaming electronic devices each incorporating:
  fourth communication means;
  a computer application for allowing the pairing of a package with the roaming electronic device.

The roaming electronic device can then serve as relay for the computer platform. Moreover, the roaming electronic device can allow the operatives of the distribution chain to interact with the package and/or with the computer platform.

Preferably, the computer platform is parameterized to carry out digital time-stamped geolocation tracking of each package.

This particularly makes it possible to count all the actions taken during the distributing of the package. For example, it is possible to accurately know at what time the package has been transferred from a first operative to a second operative, or at what time the package has crossed a border between two countries.

Advantageously, the computer platform is parameterized to emit a digital step signal to the package to modify the visual code displayed by the electronic display device, as a function of a step of transferring the package.

Thus, the change of bar code is done automatically and transparently, or almost, for the operatives of the community. Moreover, such a parameterization makes it possible to keep only one, or at the most two bar codes displayed on the package.

According to a preferred embodiment, the computer unit is parameterized to control the electronic display device to select and display a visual code as a function of geolocation coordinates coming from the geolocation system.

The change of the visual code is ensured in a totally automatic way. This allows the operatives of the distribution chain to be dispensed from performing any action on the package, on its electronic display device or on the computer platform.

Preferably, the computer platform is parameterized to receive visual codes each associated with an operative involved in the shipping of the packages, the computer platform being also parameterized to issue a request for pick-up of the package addressed to the operatives, and temporarily load into the digital storage space of the package the visual codes and their associated digital step signals, as a function of an acceptance of the request for pick-up of the package by at least one of the operatives, prior to the start of an object distributing cycle.

Thus, before the start of a distributing cycle of the package, all the operatives taking part in the distributing of the package are identified and stored in the computer unit of the package. Hence, the package can operate independently and does not need to be in a permanent communication link with a computer platform.

This ensures the distributing of the package independently of the communication conditions. In order words, even without any communication network available during the distributing, the package can, independently, proceed to the change of display of the visual codes on the display device of the package.

In an advantageous aspect, the package comprises a sonic transmitter coupled to the computer unit to emit a sonic signal as a function of the reception by the computer unit of a digital step signal.

This makes it possible to inform the operative in charge of the package of a change of visual code, or an action to be carried out on the package and/or the computer application.

Other features and advantages of the invention will become more clearly apparent on reading the following description of different preferred embodiments of the invention, given by way of illustrative and non-limiting examples, and the appended drawings among which.

Figure 1:
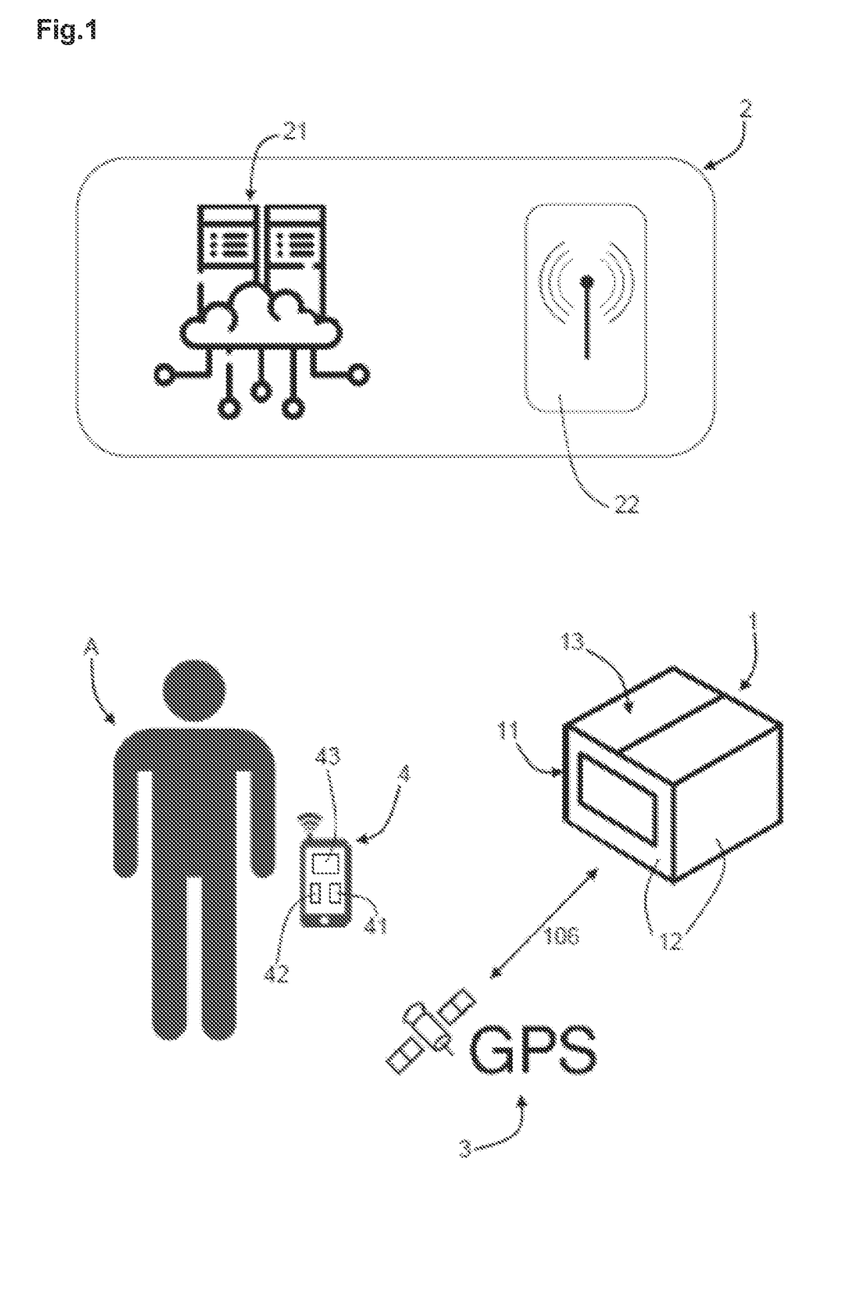
FIG. 1 is a schematic representation of a system for distributing objects according to the invention.

As illustrated in FIG. 1, the system for distributing objects comprises:
  packages 1;
  a computer platform 2;
  a geolocation system 3.

The distributing of the packages 1 is done by operatives A of a distribution chain, for example a professional logistics chain. The operatives A are therefore shipping professionals. To a lesser extent, the operatives A can be private individuals using a personal journey as an opportunity to distribute one or more packages 1.

Each package 1 comprises a crate 11 formed from panels 12 and a bottom, and a lid 13 for closing the crate 11.

Figure 2:
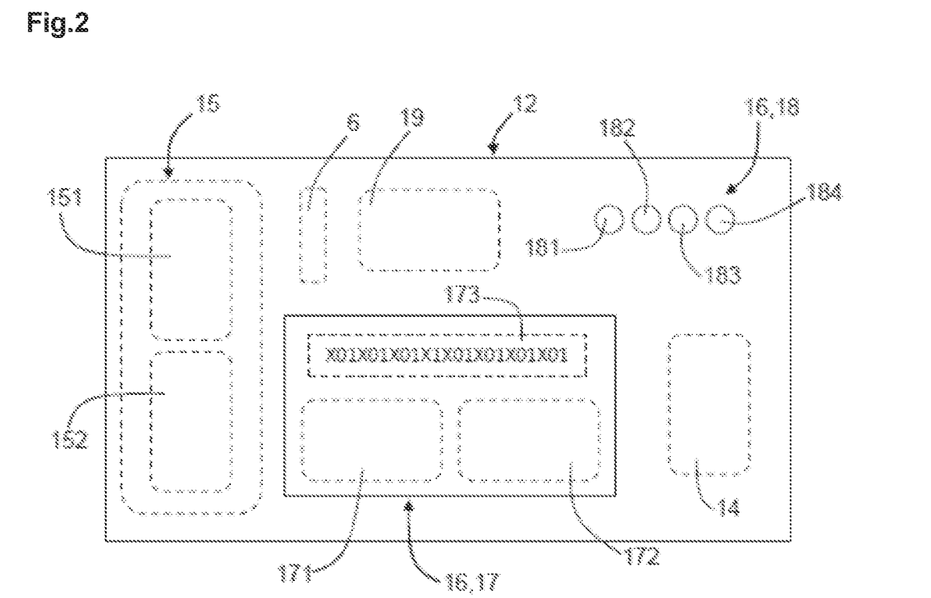
FIG. 2 is a schematic representation of a part of a package 1 of the system for distributing objects according to the invention.

With reference to FIG. 2, one of the panels 12 of the crate 11 bears:
  first wireless communication means 14;
  a computer unit 15;
  an electronic display device 16.

The first communication means 14 for example take the form of an antenna, particularly making it possible to exchange data with the computer platform 2 as described hereinafter. The computer unit 15 comprises an electronic control unit 151 and a digital storage space 152. Finally, the digital display device 16 is used to display at least one visual code as explained hereinafter. To do this, the display device 16 comprises at least one out of a digital label 17 and a set of light-emitting diodes 18.

Preferably, as illustrated in FIG. 2, the label comprises both a digital label 17 and a set of light-emitting diodes 18.

The digital label 17 is preferably of electronic paper type and comprises at least two separate display areas.

More precisely, and as illustrated in FIG. 2, the digital label 17 comprises:
- a first display area 171 used to display a first visual code;
- a second display area 172 used to display a second visual code;
- a third display area 173 used to display a third visual code.

As illustrated in FIG. 2, the set of light-emitting diodes 18 comprises four light-emitting diodes. Each light-emitting diode can in particular be associated with a particular item of information.

Each light-emitting diode is advantageously of RGB type, i.e. they emit mainly the three primary colors, namely red (R), green (G) and blue (B). From these three primary colors, it is possible, by mixing them, to create a large number of colors.

In the case of the distributing of the package 1, each diode can be used as follows:
- a first light-emitting diode 181 is associated with a continent;
- a second light-emitting diode 182 is associated with a country;
- a third light-emitting diode 183 is associated with a town;
- a fourth light-emitting diode 184 is associated with a street name.

Of course, the association of each diode can be parameterized according to the type of information to be displayed.

In other words, during a distributing cycle, the set of light-emitting diodes can be parameterized to allow the display of a first type of visual code then re-parameterized to allow the display of a second type of visual code as detailed hereinafter.

According to the preceding description of the electronic display device, the visual codes belong to the following group:
- bar codes of one-dimensional or two-dimensional type;
- light code;
- alphanumeric code.

By way of example, the first display area 171 and the second display area 172 allow the display of bar codes of one-dimensional type (i.e. a series of vertical bars, associated with a series of figures), and bar codes of two-dimensional type (i.e. QR codes for example).

The third display area 173, meanwhile, is used to display an alphanumeric code as illustrated in FIG. 2, for example the display of a recipient address.

Finally, the set of diodes 18 allows the display of a light code.

Moreover, the panel 12 also comprises a battery 19 to allow the powering of the first communication means 14, the computer unit 15 and the display device 16 independently, i.e. without requiring the package 1 to be connected to a power grid.

With reference to FIG. 1, the computer platform 2 includes:
- at least one database 21;
- second communication means 22.

The database 21 contains, for each package 1:
- a series of visual codes, intended to be temporarily loaded into the digital storage space of a package prior to the distributing of an object, as described hereinafter;
- a series of digital step signals each associated with one of the visual codes.

Each visual code is, preferably, associated with an operative A. Thus, as explained hereinafter, if several operatives A participate in the distributing of a package 1, several visual codes will then be necessary for the proper distributing of the package 1.

The computer platform 2 is advantageously parameterized to perform digital time-stamped geolocation tracking of each package 1, particularly owing to the geolocation system 3.

According to a first embodiment, particularly illustrated in FIG. 1, the geolocation system 3 takes the form of an independent system, i.e. separate from the package 1 and the computer platform 2.

To do this, the geolocation system 3 comprises third communication means intended to communicate with the first communication means of the package 1 and/or the second communication means of the computer platform 2.

According to another non-illustrated embodiment, the geolocation system is incorporated into the package 1, and is particularly connected to the computer unit 15. This makes it possible to offer even more independence to the package 1.

The distributing system also includes roaming electronic devices 4. These roaming electronic devices 4 particularly belong to the following group:
- smartphone;
- digital tablet;
- laptop computer;
- portable scanner.

These roaming electronic devices 4 particularly incorporate:
- wireless communication means 41;
- optical means 42 for recognition of visual codes;
- a computer application 43, where applicable.

The computer applicable 43 is particularly useful in the case where the roaming electronic device 4 is a smartphone. Specifically, the computer application 43 forms a communicating interface with the computer platform 2 and/or the computer unit 15 of the package 1 for the operatives A. Furthermore, the system for distributing objects comprises a computing cloud 5, the role of which will be described hereinafter. The computing cloud 5 forms a digital exchange space between the roaming electronic devices 4 and the computer platform 2 in particular.

Figure 3:
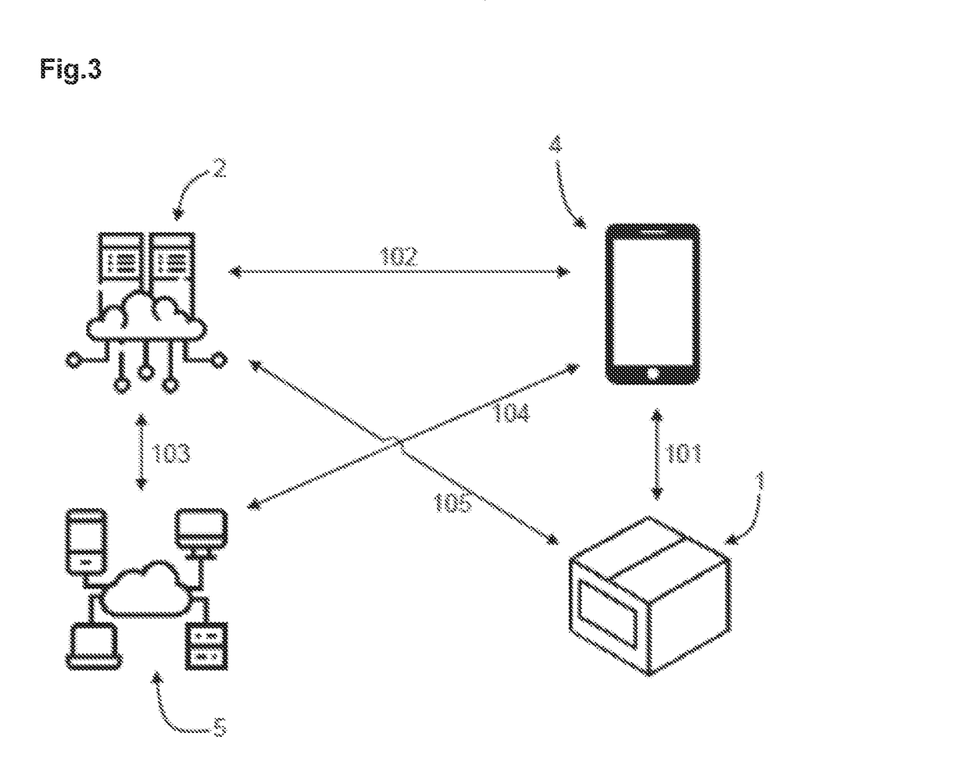
FIG. 3 is a schematic representation of communication channels between components of the system for distributing objects according to the invention.

With reference to FIGS. 1 to 3, the operation of the system for distributing objects via a package 1 is now described.

To allow the distributing of a package 1, several communication channels are opened including at least:
- a first communication channel 101 between the packages 1 and the roaming electronic devices 4;
- a second communication channel 102 between the roaming electronic devices 4 and the computer platform 102;
- a third communication channel 103 between the computer platform 2 and the computing cloud 5;
- a fourth communication channel 104 between the computing cloud 5 and the roaming electronic devices 4;
- a fifth communication channel 105 between the packages 1 and the computer platform 2,
- a sixth communication channel 106 between the packages 1 and the geolocation system 3.

A distributing cycle is initiated on the basis of the package 1, the latter comprising, for this purpose, an ad hoc actuator provided for this purpose.

The package 1 emits a signal addressed to the computer platform 2 to signify the initiation of a distributing cycle. The emission of the signal can be done directly between the package 1 and the computer platform 2 via the fifth communication channel 105, or by way of a roaming electronic device 4 (for example a smartphone) using the first communication channel 101 and the second communication channel 102.

The computer platform 2 then generates a request for pick-up of the package addressed to at least some of the operatives A.

More specifically, the platform emits the request addressed to the computing cloud, via the communication channel 103. Via the communication channel 104, the operatives A may become aware of this request by means of a roaming electronic device 4 that they hold.

The operatives A can then accept the request to distribute the package, at least for a part of its distribution.

The acceptance is transmitted to the computer platform 2 via the fourth communication channel 104 then via the third communication channel 103.

The transmission of the acceptance by the operative A can, where applicable, be accompanied by data making it possible to update the visual codes associated with the operative A, in each database 21 of the computer platform 2.

Itinerary data, along with the different visual codes and their associated digital step signals, are then transmitted by the computer platform 2 to the package 1. This transmission is then done directly between the computer platform 2 and the package 1, via the fifth communication channel 105, or by way of a roaming electronic device 4, i.e. via the second communication channel 102 then the first communication channel 101.

The package 1 therefore temporarily incorporates, the different visual codes and associated digital step signals. More precisely, the visual codes and the digital step signals are stored in the digital storage space 152 of the package 1.

When the package is in transit, the geolocating means 3 communicate, at regular intervals or continuously (or near-continuously), the geolocation coordinates of the package 1. The computer unit 15 of the package is then parameterized to control the electronic display device 17 to select a visual code among the series of visual codes temporarily loaded into the digital storage space 152 of the package 1, and make it display the visual code selected, as a function of the geolocating coordinates coming from the geolocation system 3.

More precisely, the computer unit 15 compares the coordinates coming from the geolocation system 3 with the data supplied by the computer platform and controls the display device 17 to change at least one of the visual codes it displays in case of a match. In this case, the coordinates supplied by the computer platform correspond to a digital step signal associated with a visual code.

The display of two visual codes simultaneously can for example be conditional on geographical location coordinates. Specifically, the transfer of the package from a first operative A to a second operative (not illustrated in the figures) is generally done at a precise location. In this case, the computer unit 15 of the package 1 detects the match between the coordinates coming from the geolocation system and the digital step signals and controls the electronic display device to display a first visual code in the first display area 171 and a second visual code in the second display area 172. The third display area then displays the place of transfer, a location common to the two operatives A.

With reference to FIGS. 2 and 3, a step of sorting several packages 1 is now described. Such a sorting step is generally performed in a sorting center.

During this step, the packages 1 are sorted, particularly as a function of their place of delivery. The sorting center can in particular dispose of an automated computer infrastructure which is capable of reading the visual codes and exchanging with the packages 1 to transmit to them digital signals which shall be interpreted by the computer unit 15 of the package as digital step signals. This then causes the change of the visual codes on the electronic display device 16 as a function of the sorting steps.

In this case, the sorting center can be provided with at least one terminal to detect the proximity of a package 1, this detection terminal comprising communication means for exchanging with the package on the one hand and with the computer infrastructure of the sorting center on the other hand.

For sorting centers employing human operators, the sorting of packages 1 can be done either visually by the operators or using portable scanners for example.

At each sorting step an item of information is transmitted to the package 1 to carry out a change of visual code.

For example, for a sorting by destination, the color of the first light-emitting diode 181 can be used such that the operator directs the parcel to a rack or a dedicated distributing path. To confirm the sorting, the operator can either use an ad hoc actuator of the package 1, or use a portable scanner, i.e. a roaming electronic device 4, connected to a computer system which then transmits an item of confirmation of the sorting to the package 1.

The computer unit 15 of the package 1 then recognizes a digital step signal and controls the electronic display device 16 to display at least one new visual code. This new visual code can take the form of a new bar code in one of the two display areas 171, 172 of the digital label 17 or the lighting of a light-emitting diode from the set of light-emitting diodes 18. Preferably, the activation of one of the light-emitting diodes causes the deactivation of the other light-emitting diodes from the set of light-emitting diodes.

The set of light-emitting diodes 18 can be adapted to different meanings. In other words, as a function of the step of distributing of the package, the activation of one of the light-emitting diodes can have a first meaning, different from a meaning at another distributing step.

By way of example, at the start of the cycle (for example the initial step) of distributing of the package 1, the meaning of the visual code displayed by the set of light-emitting diodes 18 can be as follows:
- the first light-emitting diode 181 corresponds to the delivery continent;
- the second light-emitting diode 182 corresponds to the delivery country;
- the third light-emitting diode 183 corresponds to the delivery town;
- the fourth light-emitting diode 184 corresponds to the delivery street.

In a final step of the cycle of distributing of the package 1, the meaning of the visual code displayed by the set of light-emitting diodes 18 can be as follows:
- the first light-emitting diode 181 corresponds to the delivery town;
- the second light-emitting diode 182 corresponds to the delivery district, where applicable;
- the third light-emitting diode 183 corresponds to the delivery block;
- the fourth light-emitting diode 184 corresponds to the delivery street.

Moreover, the adapting of the set of light-emitting diodes 18 to different meanings can be cascaded. In other words, a sorting operator can, firstly, configure only a first package 1 by means of a roaming electronic device.

Secondly, the first package 1 can communicate its configuration to the other packages nearby by putting their first respective communication means 14 in communication.

An ad hoc control device, dedicated to a function of sharing the configuration between the packages 1, can be provided on each package 1.

According to a variant embodiment, and as represented in FIG. 2, the package 1 further comprises a sonic transmitter 6 coupled to the computer unit 15 to emit a sonic signal as a function of the reception by the computer unit 15 of a digital step signal.

This makes it possible to inform the operative A in charge of the package 1 of a change of visual code on the electronic display device 16, or an action to be carried out on the package 1 and/or the computer application 43.

The invention claimed is:

1. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code,
wherein said system also comprises a plurality of roaming electronic devices each incorporating:
fourth communication means;
a computer application for allowing the pairing of a package with the roaming electronic device.

2. The system for distributing objects according to claim 1, wherein the digital step signal is emitted by means belonging to the following group:
computer platform;
geolocation system;
electronic actuator carried by the package;
roaming electronic device;
fixed terminal for detecting the proximity of a package.

3. The system for distributing objects according to claim 1, wherein the visual codes belong to the following group:
bar codes of one-dimensional or two-dimensional type;
light code;
alphanumeric code.

4. The system for distributing objects according to claim 3, wherein the digital label comprises at least two display areas each allowing the display of a visual code.

5. The system for distributing objects according to claim 3, wherein the electronic display device comprises at least one component out of:
a digital label;
a set of light-emitting diodes.

6. The system for distributing objects according to claim 5, wherein the digital label is of electronic paper type.

7. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code,
wherein the computer platform is parameterized to carry out digital time-stamped geolocation tracking of each package.

8. The system for distributing objects according to claim 7, wherein the digital step signal is emitted by means belonging to the following group:
computer platform;
geolocation system;
electronic actuator carried by the package;
roaming electronic device;
fixed terminal for detecting the proximity of a package.

9. The system for distributing objects according to claim 7, wherein the visual codes belong to the following group:
bar codes of one-dimensional or two-dimensional type;
light code;
alphanumeric code.

10. The system for distributing objects according to claim 9, wherein the electronic display device comprises at least one component out of:
a digital label;
a set of light-emitting diodes.

11. The system for distributing objects according to claim 10, wherein the digital label is of electronic paper type.

12. The system for distributing objects according to claim 9, wherein the digital label comprises at least two display areas each allowing the display of a visual code.

13. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;

control the electronic display device so that it displays the selected visual code,
wherein the computer platform is parameterized to emit a digital step signal to the package to modify the visual code displayed by the electronic display device, as a function of a step of transferring the package.

14. The system for distributing objects according to claim 13, wherein the digital step signal is emitted by means belonging to the following group:
computer platform;
geolocation system;
electronic actuator carried by the package;
roaming electronic device;
fixed terminal for detecting the proximity of a package.

15. The system for distributing objects according to claim 13, wherein the visual codes belong to the following group:
bar codes of one-dimensional or two-dimensional type;
light code;
alphanumeric code.

16. The system for distributing objects according to claim 15, wherein the digital label comprises at least two display areas each allowing the display of a visual code.

17. The system for distributing objects according to claim 15, wherein the electronic display device comprises at least one component out of:
a digital label;
a set of light-emitting diodes.

18. The system for distributing objects according to claim 17, wherein the digital label is of electronic paper type.

19. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code,
wherein the computer unit is parameterized to control the electronic display device to select and display a visual code as a function of geolocation coordinates coming from the geolocation system.

20. The system for distributing objects according to claim 19, wherein the digital step signal is emitted by means belonging to the following group:
computer platform;
geolocation system;
electronic actuator carried by the package;
roaming electronic device;
fixed terminal for detecting the proximity of a package.

21. The system for distributing objects according to claim 19, wherein the visual codes belong to the following group:
bar codes of one-dimensional or two-dimensional type;
light code;
alphanumeric code.

22. The system for distributing objects according to claim 21, wherein the electronic display device comprises at least one component out of:
a digital label;
a set of light-emitting diodes.

23. The system for distributing objects according to claim 22, wherein the digital label is of electronic paper type.

24. The system for distributing objects according to claim 23, wherein the digital label comprises at least two display areas each allowing the display of a visual code.

25. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code,
wherein the computer platform is parameterized to receive visual codes each associated with an operative involved in the shipping of the packages and in that the computer platform is also parameterized to issue a request for pick-up of the package addressed to the operatives, and temporarily load into the digital storage space of the package the visual codes and their associated digital step signals, as a function of an acceptance of the request for pick-up of the package by at least one of the operatives, prior to the start of an object distributing cycle.

26. The system for distributing objects according to claim 25, wherein the digital step signal is emitted by means belonging to the following group:
computer platform;
geolocation system;
electronic actuator carried by the package;
roaming electronic device;
fixed terminal for detecting the proximity of a package.

27. The system for distributing objects according to claim 25, wherein the visual codes belong to the following group:
bar codes of one-dimensional or two-dimensional type;
light code;
alphanumeric code.

28. The system for distributing objects according to claim 27, wherein the electronic display device comprises at least one component out of:
a digital label;
a set of light-emitting diodes.

29. The system for distributing objects according to claim 28, wherein the digital label is of electronic paper type.

30. The system for distributing objects according to claim 27, wherein the digital label comprises at least two display areas each allowing the display of a visual code.

31. A system for distributing objects, comprising:
packages incorporating:
first wireless communication means;
a computer unit;
an electronic display device;
a computer platform including:
at least one database;
second wireless communication means;
a geolocation system;
wherein the database contains, for each package:
a series of visual codes intended to be temporarily loaded into the computer unit of a package prior to the distributing of an object;
a series of digital step signals each associated with one of the visual codes;
and in that the computer unit of each package is parameterized to:
select a visual code, from among the series of visual codes temporarily loaded into the computer unit of the package, as a function of the reception by the computer unit of a digital step signal;
control the electronic display device so that it displays the selected visual code,
wherein the package comprises a sonic transmitter coupled to the computer unit to emit a sonic signal as a function of the reception by the computer unit of a digital step signal.

32. The system for distributing objects according to claim 31, wherein the digital step signal is emitted by means belonging to the following group:
computer platform;
geolocation system;
electronic actuator carried by the package;
roaming electronic device;
fixed terminal for detecting the proximity of a package.

33. The system for distributing objects according to claim 31, wherein the visual codes belong to the following group:
bar codes of one-dimensional or two-dimensional type;
light code;
alphanumeric code.

34. The system for distributing objects according to claim 33, wherein the electronic display device comprises at least one component out of:
a digital label;
a set of light-emitting diodes.

35. The system for distributing objects according to claim 34, wherein the digital label is of electronic paper type.

36. The system for distributing objects according to claim 33, wherein the digital label comprises at least two display areas each allowing the display of a visual code.

* * * * *